Patented Apr. 20, 1948

2,439,994

UNITED STATES PATENT OFFICE 2,439,994

PREPARATION OF A SILICA-ALUMINA-ZIRCONIA CATALYST

Charles L. Thomas, Western Springs, Ill., and Edward C. Lee, deceased, late of Chicago, Ill., by James T. Cullinan, administrator, Chicago, Ill., assignors to Universal Oil Products Company, Chicago, Ill., a corporation of Delaware No Drawing. Original application March 30, 1944, Serial No. 528,774. Divided and this application August 30, 1945, Serial No. 613,710

4 Claims. (Cl. 252—248)

This application is a division of our co-pending application Serial No. 528,774 filed March 30, 1944, now Patent No. 2,406,614, August 27, 1946, which in turn is a continuation-in-part of application Serial No. 243,261 filed November 30, 1938 now Patent No. 2,347,648, May 2, 1944.

This invention relates to the manufacture of catalysts. More specifically the present invention involves specific types of catalytic materials which function to selectively promote the formation of very high antiknock gasoline. The preferred catalysts are prepared synthetically by definite steps of procedure which are specific in the production of catalysts of high activity for prolonged use.

The art of pyrolytically cracking and reforming hydrocarbons to produce high antiknock gasoline is very extensive and it is recognized that most of the basic principles involved are known and that particular commercial processes have been developed which embody these principles. On the other hand, where cracking and reforming of hydrocarbons are carried out catalytically, knowledge as to the application of catalysts is largely upon the same basis as it is in other catalytic fields, that is, it is largely empirical. A large number of catalysts tried out in cracking and reforming operations accelerate reactions leading to the formation of gas rather than of high antiknock gasoline predominantly, this being particularly evidenced by reduced metal catalysts such as iron or nickel and also certain metal oxide catalysts which accelerate principally dehydrogenation reactions. The reduced metal catalysts, in particular, have the disadvantage of being sensitive to sulfur poisoning and are quickly coated with carbonaceous materials which render them practically inert. This deposition of carbonaceous materials is frequently related to the type of decomposition selectively accelerated by the catalyst.

The present invention is concerned with the manufacture of catalytic materials which are specifically adapted to accelerate the conversion of petroleum fractions and other hydrocarbonaceous materials so as to produce large yields of high antiknock gasoline boiling range fractions together with gaseous byproducts which contain unusually high percentages of readily polymerizable olefins useful in further increasing the gasoline yields. The preferred catalysts for the process are characterized by selectivity in accelerating gasoline-forming reactions rather than light-gas-forming reactions, by their selectivity in producing high antiknock gasoline, by their refractory character which enables them to retain their catalytic properties over extended periods of time under high temperature conditions of use and regeneration, by their ease and simplicity of manufacture and their exact reproducibility.

In one embodiment the present invention relates to the manufacture of a composite catalyst comprising silica, alumina, and zirconia, prepared by compositing silica with salts of aluminum and zirconium and heating said composite to decompose said salts and form the oxides thereof.

According to the present invention hydrocarbon fractions, for example, a petroleum gas oil, cracked gasoline or a straight run gasoline, may be processed at temperatures of the usual high pressure pyrolytic cracking range but at substantially lower pressures while in contact with silica-alumina-zirconia catalysts. Generally speaking, these catalysts may be considered to comprise an intimate molecular admixture of silica, alumina, and zirconia, all of the components of which indicate more or less low activity individually but in the aggregate display high activity. The activity is not an additive function, it being relatively constant for a wide range of proportions of the components whether in molecular or fractions of molecular proportions. No one component can be determined as the component for which the remaining components may be considered as the promoters according to conventional terminology, nor can any component be determined as the support and the others the catalyst proper.

Broadly speaking, the invention comprises compositing silica with aluminum and zirconium salts and decomposing the salts by heating to form the oxides thereof.

This compositing may be accomplished with the silica in a relatively dry state or in the hydrated form. The latter method is the preferable method insofar as simplicity of manufacture is concerned. One of the more convenient methods of preparing the silica hydrogel is to acidify an aqueous solution of sodium silicate by the addition of an acid such as hydrochloric or sulfuric acid. The silica hydrogel begins to form at around a pH of about 10. The excess acid and the concentration of the solution in which the precipitation is brought about determine in some measure the suitability of the silica hydrogel for a subsequent deposition of alumina and zirconia. In general, suitable hydrated silicas may be produced by the use of dilute solutions of sodium silicate and the addition of a moderate excess of acid whereby the desired active silica gel is obtained and conditions of filtering and washing are at an optimum.

After precipitating the silica it is treated and washed to substantially remove alkali metal ions. It is not known whether the alkali metal ions such as sodium ions are present in the primary gel in chemical combination or in absorbed state but it has been definitely determined that their removal is necessary if catalysts suitable for prolonged use in accelerating hydrocarbon conversion reactions are to be obtained. It is possible that the presence of the alkali metal impurities causes a sintering or fusion of the surfaces of the catalyst at elevated temperatures so that the porosity is much reduced with corresponding reduction in active surfaces. Alkali metal ions may be removed by treating with solutions of acidic materials, ammonium salts generally, or salts of multivalent metals, more preferably those of aluminum and zirconium. When treating with acids, as for example, with hydrochloric or sulfuric acids, the acid extracts the alkali metal impurities in the silica gel. The salts formed and excess acid are then substantially removed by water washing treatment. Where ammonium salts or salts of multi-valent metals are used, the ammonium or multi-valent metals apparently displace the alkali metal impurities present in the composite, and the alkali metal salts formed, together with the major portion of the multi-valent salts, are removed in the water washing treatment.

In accordance with the present invention the purified silica hydrogel is mixed with suitable amounts of the salts of aluminum and zirconium forming a paste and the resultant paste heated whereby aluminum and zirconium are deposited upon the silica gel as a result of the decomposition of the aluminum and zirconium salts. Suitable aluminum salts which may be employed in the preparation of the catalysts are aluminum acetate, aluminum chlorate, bromate, nitrate, and other similar salts which decompose at relatively low temperatures. Suitable zirconium salts comprise zirconium nitrate, zirconium oxalate, zirconium oxyiodide and similar salts which decompose at relatively low temperatures.

The character and efficiency of the ultimately prepared silica-alumina-zirconia catalyst will vary more or less with the precipitation of the silica hydrogel purification treatment, ratio of the components, and drying and calcining procedures employed. The ratio of the components may be varied within wide limits, the limiting factor being more in evidence in respect to small proportions than with larger proportions of the various components. In general, it appears that two to six mole per cent of alumina and zirconia together with reference to silica may be considered an approximation of the minimum proportions. Experience has indicated superior results as to yields and octane number of gasoline product for catalysts comprising silica, alumina and zirconia as compared with silica-alumina or silica-zirconia catalysts. It has also been observed for some charging stocks that as the amount of zirconia is increased in a catalyst composite the dehydrogenating reactions are increased so that the gases evolved contain larger percentages of hydrogen. Further, the zirconia containing catalysts seem to be more stable to high temperature regeneration than the silica-alumina catalysts.

The composite catalyst formed by the decomposition of the aluminum and zirconium salts to produce alumina and zirconia on the silica may be employed in the conversion reaction in various sizes and shapes including finely divided materials such as powders, granular material or pelleted forms.

We have found that by calcining the composite at temperatures of the order of approximately 850° to about 1000° F., or higher, maximum activity of the catalyst is obtained and a further dehydration occurs.

The catalysts prepared by the procedure outlined evidently possess a large total contact surface corresponding to a desirable porosity, the pores of the catalyst particles being of such size and shape that they do not become clogged with carbonaceous deposits after a long period of service and are, therefore, not difficult to reactivate by oxidation. This structure is also retained after many alternate periods of use and reactivation as evidenced by the fact that the catalysts may be repeatedly reactivated by passing air, or other oxidizing gas, over the spent particles to burn off deposits of carbonaceous material at temperatures above 800° F., temperatures as high as 1400–1600° F. having been reached without apparently affecting the catalytic activity.

In accordance with the present invention the catalyst may be conveniently utilized in cracking and reforming reactions, as for example, when employed as filling material in tubes or chambers in the form of small pellets or granules in fixed bed relationship to the incoming reactants. The catalyst may be also employed in a finely divided state in "fluidized" or compact moving bed type of operation.

In the so-called fluidized operation the hydrocarbons are passed upwardly through a body of finely divided catalyst in a reaction zone maintained under the desired conversion conditions, causing the catalyst particles to be motionalized and forming a fluid-like mass of catalyst. In this operation the catalyst may be continually withdrawn from the reaction zone and introduced into a regeneration zone wherein the carbonaceous materials are removed from the catalysts by combustion and the regenerated catalyst recycled to the reaction zone.

In the moving bed type of operation a comparatively compact bed of catalyst is passed through the reaction zone concurrently or countercurrently to the incoming reactants. The catalyst is continually withdrawn from the reaction zone into a regeneration zone wherein the carbonaceous material is removed therefrom and the regenerated catalyst continuously recycled to the reaction zone.

After the passage of the oil vapors over the catalyst, the products may be separated into material unsuitable for further cracking, intermediate insufficiently converted fractions amenable to further catalytic cracking, gasoline boiling range materials, and gases, the intermediate fractions being returned directly to admixture with the charging stock so that ultimately there is complete recycling of all fractions and maximum utilization of the charging stock for gasoline production. As an alternative mode of operation the catalyst may be suspended in a stream of oil as a powder and treated under suitable conditions of temperature, pressure, and contact time.

The charging stock may comprise hydrocarbon fractions which are vaporizable without substantial decomposition, heavier hydrocarbonaceous materials which are not readily vaporized, or generally, the high boiling as well as lower boiling fractions. It should be recognized that hydrocarbon mixtures of low antiknock value such as naphtha cuts, gasoline lacking in light and/or heavy ends, cracked gasoline, synthetic products, etc., may be processed according to the present invention.

The normally gaseous fraction separated from the gasoline product contains much larger proportions of readily polymerizable olefins, more particularly propene and butenes, than are usually experienced in ordinary thermal cracking and these may be readily polymerized using thermal and/or catalytic treatment to produce additional yields of gasoline which may be blended if desired with the major gasoline product produced in the process. A number of polymerizing catalysts are generally known, particularly phosphoric acid deposited on siliceous adsorbent, and this and/or other polymerizing catalysts may be used to polymerize the above mentioned olefins.

The application of the present invention to cracking and reforming of hydrocarbon fractions besides being characterized by the presence of novel catalysts is further characterized by the moderate operating conditions of temperature and pressure. Temperatures employed in contact with the catalysts may be within the range of 800 to 1200° F. Substantially atmospheric pressure or moderate superatmospheric pressure up to 90 pounds per square inch or more may be used, such pressures being somewhat governed by flow conditions through the vaporizing and conversion zones and the subsequent fractionating and collecting equipment.

The following example illustrates the method of preparation of the catalyst and its use in catalytic cracking. However, it is not intended that this example unduly limit the general broad scope of this invention in strict accordance with the specific data hereinafter presented.

The catalyst prepared according to the present invention consists of approximately 100 moles of silica, 4 moles of alumina and 4 moles of zirconia.

1200 cc. of a commercial grade of sodium silicate is diluted with 12 liters of water. A dilute solution of hydrochloric acid is also prepared by diluting 420 cc. of concentrated (12 normal) hydrochloric acid with 1580 cc. of water. 1600 cc. of dilute hydrochloric acid is gradually added to the diluted sodium silicate which is then further diluted by the addition of 3 liters of water. An additional 300 cc. of the dilute acid is finally added after which the precipitated silica gel is collected on a filter. The silica gel is then slurried in 10 liters of water and again filtered, this operation being repeated several times. Subsequently the washed silica gel is treated to remove alkali metal ions still remaining as impurities in the silica gel by further treatment with dilute hydrochloric acid, the silica gel being slurried in 10 liters of water containing 45 cc. of the concentrated acid, the treatment being repeated twice. The precipitate is then subsequently washed several times until substantially chloride free. 913 parts by weight corresponding to 1.86 moles of purified silica hydrogel is mixed with 20.4 parts by weight (0.0744 mole) of zirconium nitrate and 32 parts by weight (0.15 mole) of aluminum nitrate. The mixture is heated to 350° C. to decompose the aluminum and zirconium salts and deposit alumina and zirconia thereon. The dried material is then pressed and broken up to obtain granular particles which are subsequently calcined at approximately 900° F.

Using Pennsylvania gas oil as charging stock a yield of 28.4% by volume of 400° F. end point gasoline is obtained in a once through operation, the octane number of the gasoline being 79.5. There is also produced 5.7% by volume of the original charge of readily polymerizable 3 and 4 carbon atom olefins.

We claim as our invention:

1. A process for manufacturing a catalyst which comprises commingling silica with decomposable salts of aluminum and zirconium and heating the resultant mixture sufficiently to convert said salts to oxides.

2. A process for manufacturing a catalyst which comprises commingling a precipitated silica with decomposable salts of aluminum and zirconium and heating the resultant mixture sufficiently to convert said salts to oxides.

3. A process for manufacturing a catalyst which comprises precipitating a silica hydrogel from a solution of an alkali metal silicate by the addition of acid thereto, commingling said hydrogel with decomposable salts of aluminum and zirconium and heating the resultant mixture to convert said salts to oxides.

4. A process for manufacturing a catalyst which comprises precipitating a silica hydrogel from a solution of an alkali metal silicate by the addition of acid thereto, treating said hydrogel with a reactant capable of removing alkali metal ions from said gel, commingling said hydrogel with decomposable salts of aluminum and zirconium and heating the resultant mixture to convert said salts to oxides.

CHARLES L. THOMAS.
JAMES T. CULLINAN.
*Administrator of the Estate of Edward C. Lee, Deceased.*

REFERENCES CITED

The following references are of record in the file of this patent:

UNITED STATES PATENTS

| Number | Name | Date |
|---|---|---|
| 1,782,857 | Miller et al. | Nov. 25, 1930 |
| 2,107,710 | Perkins et al. | Feb. 8, 1938 |
| 2,249,583 | Thomas | Nov. 30, 1938 |
| 2,257,157 | Connolly | Sept. 30, 1941 |
| 2,356,303 | Connolly | Aug. 22, 1944 |